(12) United States Patent
Heslouis et al.

(10) Patent No.: US 11,561,414 B2
(45) Date of Patent: Jan. 24, 2023

(54) METHOD FOR DETERMINING AN OPHTHALMIC LENS

(71) Applicant: Essilor International, Charenton-le-Pont (FR)

(72) Inventors: Mélanie Heslouis, Charenton-le-Pont (FR); Olivier Roussel, Charenton-le-Pont (FR); Laurent Calixte, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 17/261,747

(22) PCT Filed: Aug. 27, 2019

(86) PCT No.: PCT/EP2019/072789
§ 371 (c)(1),
(2) Date: Jan. 20, 2021

(87) PCT Pub. No.: WO2020/043698
PCT Pub. Date: Mar. 5, 2020

(65) Prior Publication Data
US 2021/0278701 A1    Sep. 9, 2021

(30) Foreign Application Priority Data

Aug. 28, 2018    (EP) .................................... 18306139

(51) Int. Cl.
*G02C 7/06* (2006.01)
*G02C 7/02* (2006.01)

(52) U.S. Cl.
CPC ............. *G02C 7/061* (2013.01); *G02C 7/025* (2013.01)

(58) Field of Classification Search
CPC ................................ G02C 7/025; G02C 7/061
USPC .......................................................... 351/246
See application file for complete search history.

(56) References Cited

U.S. PATENT DOCUMENTS

| 6,637,880 B1 | 10/2003 | Yamakaji et al. |
| 2004/0032565 A1 | 2/2004 | Yamakaji et al. |
| 2010/0271590 A1 | 10/2010 | Kitani et al. |
| 2011/0051082 A1* | 3/2011 | Becken .................. G02C 7/024 |
| | | 351/159.76 |

(Continued)

FOREIGN PATENT DOCUMENTS

WO    WO 2017/064060 A1    4/2017

OTHER PUBLICATIONS

International Search Report and Written Opinion dated Dec. 2, 2019 in PCT/EP2019/072789 filed Aug. 27, 2019.

*Primary Examiner* — James R Greece
(74) *Attorney, Agent, or Firm* — Oblon, McClelland, Maier & Neustadt, L.L.P.

(57) ABSTRACT

A method for determining an ophthalmic lens adapted to a wearer, the method including: receiving wearer data including at least the ophthalmic prescription of the wearer; receiving a set of object points associated with target optical performances based on the wearer data; determining an ophthalmic lens adapted to the wearer, the ophthalmic lens providing optical performances, for light rays propagating from the set of object points to the center of rotation of the eye of the wearer passing through the ophthalmic lens, the closest to the target optical performances.

13 Claims, 6 Drawing Sheets

(56) References Cited

U.S. PATENT DOCUMENTS

2014/0293216 A1* 10/2014 Muradore ............. G02C 7/066
　　　　　　　　　　　　　　　　　　　　　　351/159.41
2016/0004096 A1　　 1/2016 Kozu
2018/0299694 A1　 10/2018 Rousseau et al.

* cited by examiner

METHOD FOR DETERMINING AN OPHTHALMIC LENS

TECHNICAL FIELD

The invention relates to a method implemented by computer means for determining an ophthalmic lens adapted to a wearer and a pair of ophthalmic lenses adapted for a wearer.

BACKGROUND OF THE INVENTION

As illustrated on FIG. 1, to calculate an ophthalmic lens 10, lens designers usually use a so-called ergorama 12.

The ergorama is a function associating to each gaze direction ($\alpha$, $\beta$) a distance of an object point $O_i$. The ergorama is usually the same for each wearer or may be selected based on the addition of the prescription of the wearer when such prescription comprises an addition value.

Methods for determining an ophthalmic lens using such ergorama provide satisfactory results, but may need to be improved, in particular so as to improve binocular performances of a pair of ophthalmic lenses.

Therefore, it appears that there is a need for a method of determining ophthalmic lenses that would improve the optical performances of the determined ophthalmic lenses, in particular binocular performances.

SUMMARY OF THE INVENTION

To this end, the invention proposes a method, for example implemented by computer means, for determining an ophthalmic lens adapted to a wearer, the method comprising the following steps of:
  receiving wearer data comprising at least the ophthalmic prescription of said wearer;
  receiving a set of object points associated with target optical performances based on the wearer data;
  determining an ophthalmic lens adapted to the wearer, said ophthalmic lens providing optical performances, for light rays propagating from the set of object points to the center of rotation of the eye of the wearer passing through the ophthalmic lens, the closest to the target optical performances.

Advantageously, using a set of points associated with target optical performances based on the wearer data, in particular on the ophthalmic prescription of the wearer when determining the ophthalmic lens, improves the overall optical performance of the determined ophthalmic lens.

Indeed, when considering only an ergorama having object distance given for a given lowering gaze means that the lens designer does not analyze and optimize the ophthalmic lens for a given object. Indeed, object changes depending on prismatic deviation of the ophthalmic lens.

According to further embodiments which can be considered alone or in combination:
  the set of object points is determined by:
    determining a set of object points based on the wearer data,
    associating target optical performances to the set of object points based on the wearer data; and/or
  the set of object points and the associated target optical performances are determined using a reference ophthalmic lens based on the prescription of the wearer data placed in reference wearing conditions in front of the center of rotation of a reference eye; and/or
  upon determining an ophthalmic lens, the set of object points associated with target optical performances are unchanged; and/or
  the reference ophthalmic lens corresponds to an ophthalmic lens based on the ophthalmic prescription of the right eye of the wearer or the left eye of the wearer or based on the weighted average ophthalmic prescription between both eyes of the wearer; and/or
  the reference eye is the right eye of the wearer or the left eye of the wearer or the cyclopean eye of the wearer; and/or
  the reference wearing conditions correspond to the wearing conditions of an ophthalmic lens in front of the right eye of the wearer or in front of the left eye of the wearer or to weighted average wearing conditions between both eyes of the wearer; and/or
  the reference wearing conditions are standard wearing conditions; and/or
  determining an ophthalmic lens adapted to the wearer comprises, at least, selecting among a list of different ophthalmic lenses the ophthalmic lens that provides optical performances for light rays propagating from a selection of at least part of object points of said set of object points to the center of rotation of the eye of the wearer passing through the ophthalmic lens the closest to the target optical performances; and/or
  determining an ophthalmic lens adapted to the wearer comprises optimizing an initial ophthalmic lens so that the light rays propagating from a selection of at least part of object points of said set of object points to the center of rotation of the eye of the wearer passing through the ophthalmic lens fulfill at best the target optical performances; and/or
  the object points of the selection of at least part of object points are unchanged during the optimization of the initial ophthalmic lens; and/or
  when associating target optical performances to a selection of points of the set of object points, at least one object point at a first distance from the center of rotation of the eye has the optical power and/or the astigmatism and/or the astigmatism axis that corresponds to said first distance vision prescription of the wearer; and/or
  the ophthalmic lens is a power variation ophthalmic lens having at least two points of reference corresponding to ophthalmic prescriptions for two different viewing distances; and/or
  when associating target optical performances to a selection of points of the set of object points, at least one object point at a second distance different from the first distance has the optical power and/or the astigmatism and/or the astigmatism axis that corresponds to said second distance vision prescription of the wearer; and/or
  the method further comprises prior to associating target optical performances, a step of projecting a selection of at least part of object points that correspond to the meridian of the reference ophthalmic lens on a plane; and/or
  said selection of object points is projected on the sagittal plane of the wearer; and/or
  the method further comprises prior to associating target optical performances, a step of extruding a selection of a least part of said set of object points either along a direction or about an axis passing through a point along the segment linking both center of rotation of the eyes of the wearer; and/or the determined ophthalmic lens is intended to be manufactured.

The invention also relates to a method of manufacturing an ophthalmic lens for a wearer, said method comprising the steps of the method of the invention and a manufacturing step during which the determined ophthalmic lens is manufactured.

The invention further relates to a method implemented by computer means for determining a pair of ophthalmic lenses adapted to a wearer, the method comprising implementing the method according to any of the preceding claims to both ophthalmic lenses using a common selection of binocular object points corresponding to at least part of the set of object points associated with target optical performances based on the wearer data.

Advantageously, the applying the method of the invention to determining a pair of ophthalmic lenses allows increasing binocular performances, in particular improve fusion.

According to further embodiments which can be considered alone or in combination:
- the common selection of binocular object points corresponds to a weighted sum of the projection of a selection of at least part of object points that correspond to the meridian of each reference ophthalmic lens on a common plane; and/or
- the weighted sum is done for a plurality of gazing direction from the cyclopean eye of the wearer; and/or
- the position of the common plane along the line passing through the centers of rotation of the eyes of the wearer is determined based on the dominant eye of the wearer; and/or
- the relative weight in the weighted sum is determined based on the dominant eye of the wearer.

The invention further relates to a pair of progressive ophthalmic lenses adapted for a wearer in worn conditions, wherein for a given set of object points corresponding to gaze directions within an angular disc of 35° of diameter centered on a direction of gaze corresponding to an angle of declination of 8° and 0° of azimuth angle and with a sampling step of 2°, $$\frac{1}{\sum_{object\ points}} \sum_{object\ points} \frac{|A_r - A_l|}{Add}$$

is smaller than or equal to 0.026 with Ar the resulting astigmatism at the given object point through the right progressive ophthalmic lens, Al the resulting astigmatism at the given object point through the left progressive ophthalmic lens and Add the prescribed addition of the wearer.

According to further embodiments which can be considered alone or in combination:

$$\frac{1}{\sum_{object\ points}} \sum_{object\ points} \frac{|P_r - P_l|}{Add}$$

is smaller than or equal to 0.026 with Pr the mean power at the given object point through the right progressive ophthalmic lens and Pl the mean power at the given object point through the left progressive ophthalmic lens; and/or
the pair of progressive ophthalmic lenses is made for an anisometrope wearer.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a method, for example implemented by computer means, for determining an ophthalmic lens adapted to a wearer.

In the present description, terms like «up», «bottom», «horizontal», «vertical», «above», «below», «front», «rear» or other words indicating relative position may be used. These terms are to be understood in the wearing conditions of the ophthalmic lens.

In the context of the present invention, the term "ophthalmic lens" can refer to an uncut ophthalmic lens or a spectacle ophthalmic lens edged to fit a specific spectacle frame.

Figure 2:
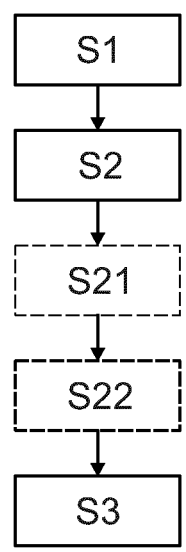
FIG. 2 illustrates the main steps of the method of the invention.

As illustrated on FIG. 2, the method according to the invention comprises at least the following steps:
receiving wearer data S1,
receiving a set of object points S2, and
determining an ophthalmic lens adapted to the wearer S3.

The wearer data received during step S1, comprise at least the ophthalmic prescription of the wearer.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision. The prescription for a progressive addition lens comprises values of optical power and of astigmatism at the distance vision point and, when appropriate, an addition value.

According to an embodiment of the invention, the wearer data may further comprise the wearing conditions of the wearer.

The wearing conditions are to be understood as the position of the ophthalmic lens with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

Figure 5:
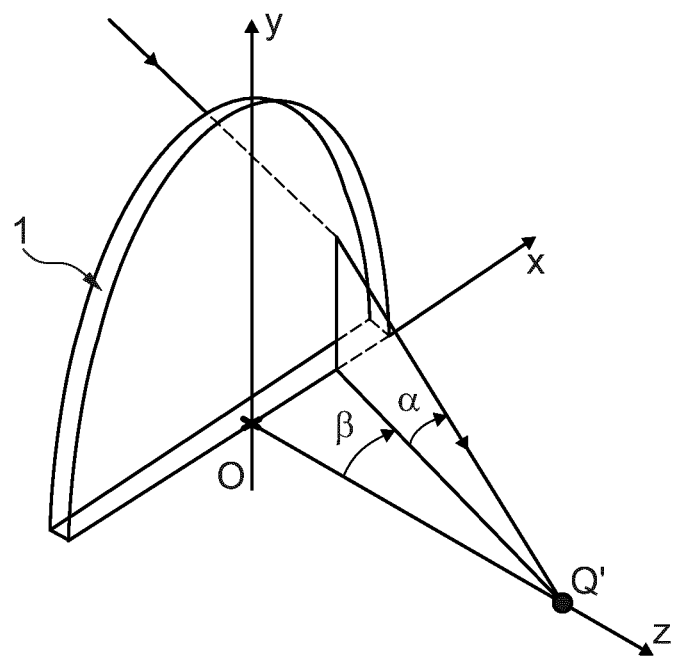
FIGS. 5 and 6 show, diagrammatically, optical systems of eye and lens.

The pantoscopic angle is the angle in the vertical plane, at the intersection between the back surface of the lens and the visual axis of the eye in the primary position (usually taken to be the horizontal) and represented by axis Z in FIG. 5, between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

Although the invention is not limited to progressive lenses, the wording used in this description is illustrated in FIGS. 1 to 10 of document WO2016/146590 for a progressive lens. The skilled person can adapt the definitions for single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

The local maximum and minimum radius curvature are positive when the center of curvature is on the positive side of axis Z, as represented on FIG. 5, the reference of axis Z being the 0 point. When the center of curvature is on the negative side of axis Z the local maximum and minimum radius curvature are negative.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}}, \text{ and}$$

$$SPH_{min} = (n-1) * CURV_{min} = \frac{n-1}{R_{max}}$$

where n is the index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

a cylinder CYL is also defined by the formula $CYL = |SPH_{max} - SPH_{min}|$.

The characteristics of any aspherical face of the lens may be expressed by the local mean spheres and cylinders. A surface can be considered as locally non-spherical when the cylinder is at least 0.25 diopters.

Figure 3:
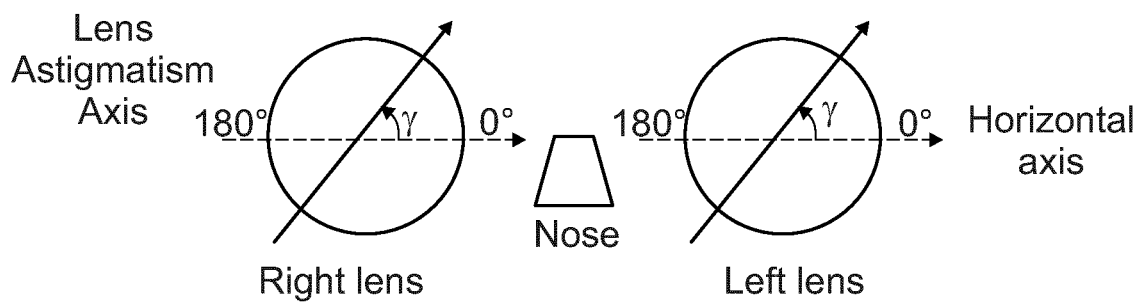
FIG. 3 illustrates the astigmatism axis γ of a lens in the TABO convention.
Figure 4:
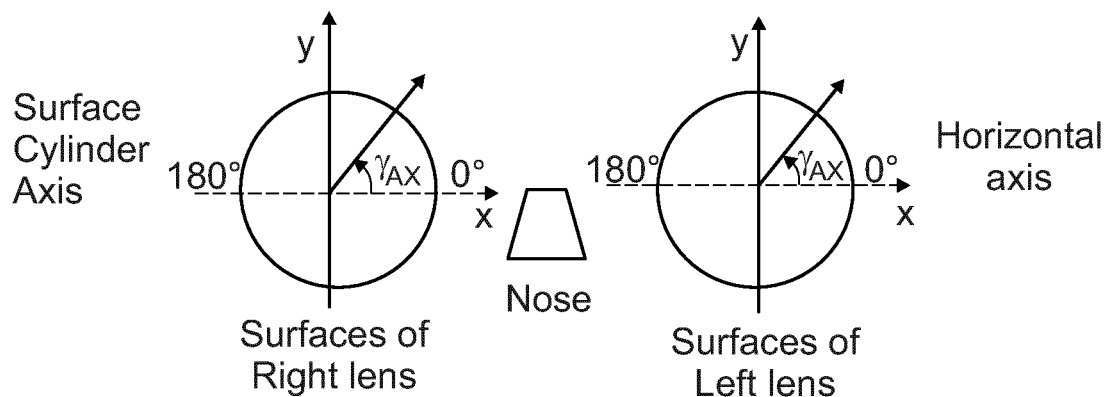
FIG. 4 illustrates the cylinder axis $\gamma_{AX}$ in a convention used to characterize an aspherical surface.

For an aspherical surface, a local cylinder axis γAX may further be defined. FIG. 3 illustrates the astigmatism axis γ as defined in the TABO convention and FIG. 4 illustrates the cylinder axis γAX in a convention defined to characterize an aspherical surface.

The cylinder axis γAX is the angle of the orientation of the maximum curvature CURVmax with relation to a reference axis and in the chosen sense of rotation. In the above defined convention, the reference axis is horizontal (the angle of this reference axis is 0°) and the sense of rotation is counter clockwise for each eye, when looking at the wearer) (0°≤γAX≤180°. An axis value for the cylinder axis γAX of +45° therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 6:
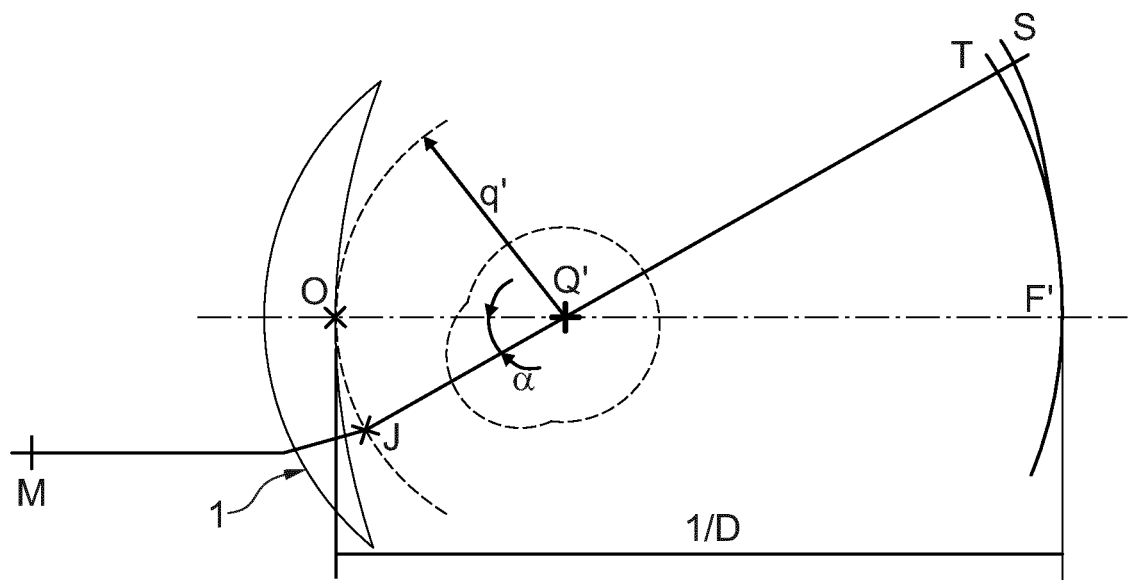

FIGS. 5 and 6 are diagrammatic illustrations of optical systems of eye and lens, thus showing the definitions used in the description. More precisely, FIG. 5 represents a perspective view of such a system illustrating parameters α and β used to define a gaze direction. FIG. 6 is a view in the vertical plane parallel to the antero-posterior axis of the wearer's head and passing through the center of rotation of the eye in the case when the parameter β is equal to 0.

The center of rotation of the eye is labelled Q'. The axis Q'F', shown on FIG. 6 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 5—corresponds to a position of the eye in rotation around Q' and to a point J of the apex sphere; the angle θ is the angle formed between the axis Q'F' and the projection of the straight line Q'J on the horizontal plane comprising the axis Q'F'. The angle α is the angle formed between the axis Q'J and the projection of the straight line Q'J on the horizontal plane comprising the axis Q'F'; this angle appears on the scheme on FIGS. 5 and 6. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Using these elements, it is possible to define a wearer optical power and astigmatism, in each gaze direction. An object point M at an object distance is considered for a gaze direction (α,β). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere.

For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = Pr\,oxO + Pr\,oxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame {Q', xm, ym, zm} linked to the eye. It corresponds to the angle with which the image S or T i formed depending on the convention used with relation to the direction zm in the plane {Q', zm, ym}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

A set of object points is received during step S2. Each point of the set of object points is associated with a target optical performance based on the wearer data.

When the optical performance relates to an ophthalmic prescription data, the target optical performance is to be understood as a deviation relative to the value of the ophthalmic prescription of the wearer. For example, when the optical performance relates to the optical power, the target optical performance is to be understand as a difference with the prescribed optical power.

The optical performance may further relate to unwanted astigmatism and/or higher order aberrations such as acuity or contrast.

The optical performance a preferably considered for central vision but may alternatively or in addition be considered for peripherical vision.

According to an embodiment of the invention, the set of object points may be determined by:
  determining a set of object points S21, and
  associating target optical performances S22.

According an embodiment of the invention, the set of object points and the associated optical performances are determined using a reference ophthalmic lens placed in reference wearing conditions in front of the center of rotation of the eye of the wearer.

The reference ophthalmic lens may be determined based on the ophthalmic prescription of either the right or left eye of the wearer, preferably the prescription of the eye for which the ophthalmic lens to be determined in to be worn, or alternatively based on a weighted average ophthalmic prescription between both eyes of the wearer.

The weights of weighted average ophthalmic prescription may be based on the dominant eye of the wearer. For example, if the right eye of the wearer is dominant, the average ophthalmic prescription may be determined using a greater weight for the right eye ophthalmic prescription.

Figure 1:
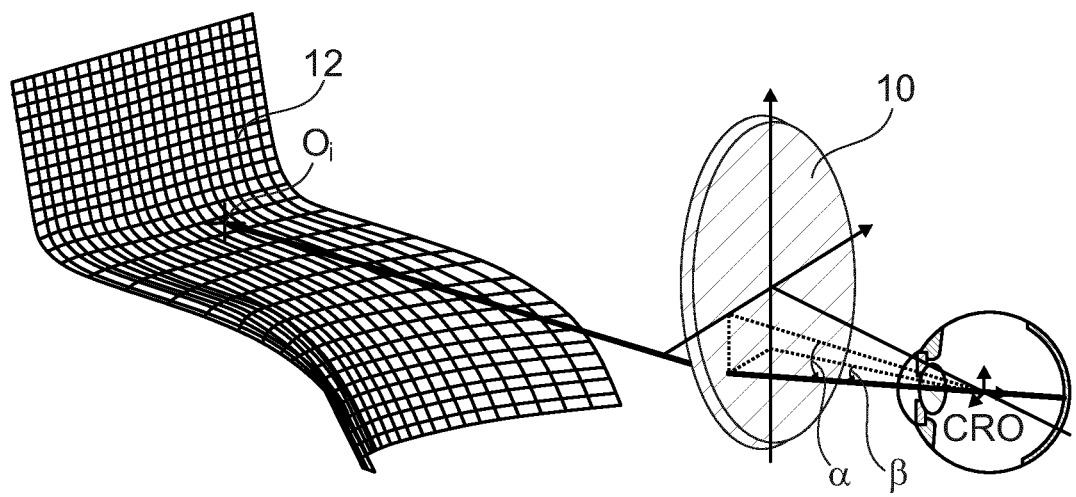
FIG. 1 illustrates an ergorama used in prior art methods.
Figure 7:
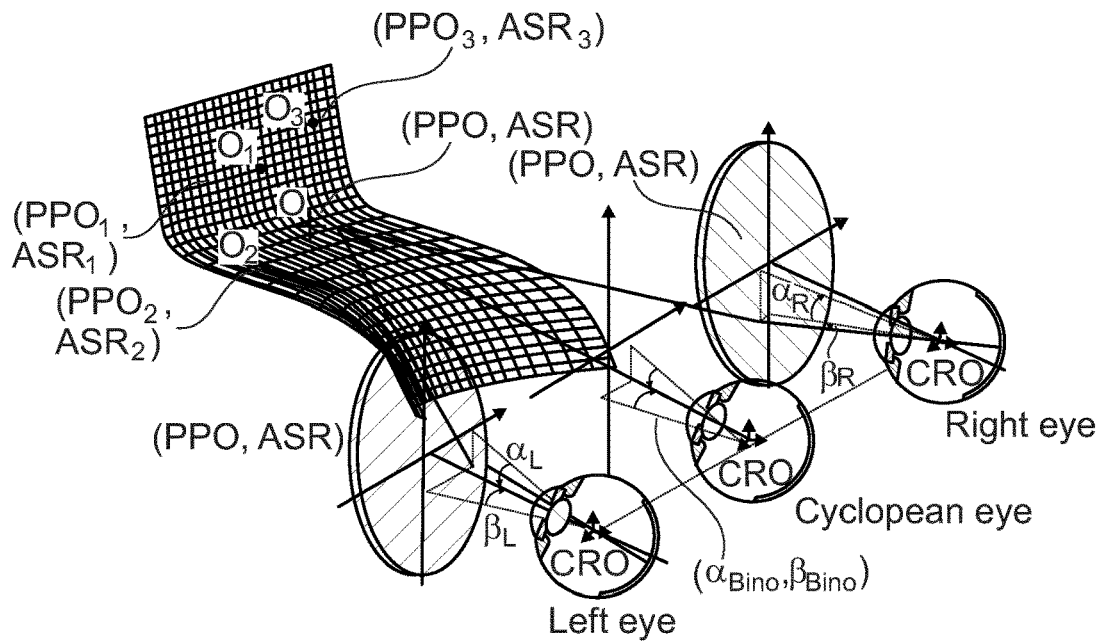
FIG. 7 illustrates reference ophthalmic lenses placed between a set of object points associated with target optical performances and the eyes of the wearer.

As illustrated on FIGS. 1 and 7, the reference ophthalmic lens is placed in front of the right eye of the wearer or the left eye of the wearer or the cyclopean eye of the wearer.

In the sense of the invention, the cyclopean eye is a virtual eye used as a reference of the binocular visual system, which is positioned by default in the middle of the centers of rotation of both eyes, but which can be positioned elsewhere on the segment connecting the centers of rotation of the both eyes, for example depending on the visual dominance.

The reference wearing conditions may correspond to the wearing conditions of an ophthalmic lens in front of the right eye of the wearer or in front of the left eye of the wearer or to weighted average wearing conditions between both eyes of the wearer.

The weights of weighted average wearing conditions may be based on the dominant eye of the wearer. For example, if the right eye of the wearer is dominant, the average wearing conditions may be determined using a greater weight for the wearing condition in front of the right eye of the wearer.

The wearing conditions may be standard wearing conditions or alternatively the wearing conditions may be customized wearing conditions, for example measured on the wearer.

The method may further comprise providing an initial ergorama.

An ergorama is a function associating to each gaze direction the distance of an object point. Typically, in far vision following the primary gaze direction, the object point is at infinity. In near vision, following a gaze direction essentially corresponding to an angle α of the order of 35° and to an angle θ of the order of 5° in absolute value toward the nasal side, the object distance is of the order of 30 to 50 cm. For more details concerning a possible definition of an ergorama, U.S. Pat. No. 6,318,859 may be considered. An example of ergorama is disclosed in FIG. 6 of WO9812590.

The reference ophthalmic lens is placed in reference wearing conditions between the initial ergorama and the reference eye of the wearer.

The optical power profile is well defined along the meridian line of the ophthalmic lens.

The method of the invention may further comprise prior to associating target optical performances, a step of projecting a selection of at least part of object points that correspond to the meridian of the reference ophthalmic lens on a plane.

For each point of the meridian, one can evaluate at least the optical power and optionally other optical parameter such as astigmatism using an object point given by the initial ergorama. The optical power may optionally be evaluated using accommodation by the wearer determined from the accommodative range and prescribed addition and object distance.

For said object point the object proximity may be determined in said projection plane based on the given optical power.

The object point position is adapted until the object proximity and the optical power of the reference ophthalmic lens and eventually the remaining accommodation of the wearer, are consistent.

In addition, prismatic deviations through the lens can be taken into account to place the object point in 3 dimensions.

Such adaptation of the object proximity may be carried out for a selection of object points, for example object points corresponding to the meridian of the reference ophthalmic lens.

According to an embodiment of the invention, the projection plane may be the sagittal plane of the wearer.

The sagittal plane may be defined either as a vertical plane passing through the cyclops eye or by the bridge of the nose.

The method of the invention may further comprise a step of extruding a selection of a least part of said set of object points either along a direction or about an axis passing through a point along the segment linking both center of rotation of the eyes of the wearer.

Base to newly determined visual environment, each object point can be linked to optical performances, for example optical power performance and/or astigmatism performances evaluated with the reference ophthalmic lens.

The optical propagation from an object point to the center of rotation of the eye, passing through the reference ophthalmic lens gives a target optical performance for this point.

According to an embodiment, when associating target optical performances to a selection of points of the set of object points, at least one object point at a first distance from the center of rotation of the eye has the optical power and/or the astigmatism and/or the astigmatism axis that corresponds to said first distance vision prescription of the wearer.

For example, the first distance is greater than or equal than 5 meters and the optical power and/or astigmatism and/or the astigmatism axis corresponds to far vision.

The ophthalmic lens to be determined by the method of the invention may be a power variation ophthalmic lens having at least two points of reference corresponding to ophthalmic prescriptions for two different viewing distances.

For example, the optical power difference between the at least two points of reference may be greater than or equal to 0.75 diopters.

When the ophthalmic lens is a power variation ophthalmic lens the method comprises that when associating target optical performances to a selection of points of the set of object points, at least one object point at a second distance different from the first distance has the optical power and/or the astigmatism and/or the astigmatism axis that corresponds to said second distance vision prescription of the wearer.

For example, the second distance may correspond to a near vision distance, such as 40 cm.

An ophthalmic lens adapted to the wearer is determined in step S3. The ophthalmic lens is determined as providing optical performances, for light rays propagating from the set of object points to the center of rotation of the eye of the wearer passing through the ophthalmic lens, the closest to the target optical performances.

For example, for each lens to be determined a merit function is determined using all or a selection of the set of object points seen through the ophthalmic lens and comparing the target optical performances with the current optical performances.

Typically, the merit function may be a weighted sum of the squares of the deviations between the target value and the current value for each selected object point and for each type of optical performance.

For example, step S3 is an interactive process starting with an initial ophthalmic lens. An initial merit function is determined using the set of object points associated with target optical performances.

The ophthalmic lens is then modified, for example one or both optical surfaces of the ophthalmic lens or the index of the constituent material of the lens.

A new merit function for the modified ophthalmic lens is determined using the same set of object points associated with the same target optical performances.

The process is repeated, for example until the merit function reaches a threshold value or the number of iterations reaches a predefined number.

During the iteration process the set of object points and the associated target optical performances are unchanged.

According to an embodiment of the invention, determining an ophthalmic lens adapted to the wearer comprises, at least, selecting among a list of different ophthalmic lenses the ophthalmic lens that provides optical performances for light rays propagating from a selection of at least part of object points of said set of object points to the center of rotation of the eye of the wearer passing through the ophthalmic lens the closest to the target optical performances.

Alternatively, determining an ophthalmic lens adapted to the wearer comprises optimizing, for example minimizing a merit function as defined previously, an initial ophthalmic lens so that the light rays propagating from a selection of at least part of object points of said set of object points to the center of rotation of the eye of the wearer passing through the ophthalmic lens fulfil at best the target optical performances.

The method of the invention may advantageously by used to determine a pair of ophthalmic lenses. Indeed, the inventors have observed that the binocular performances of a pair of ophthalmic lenses determined using a method of the invention increases, in particular the fusion.

To determine a pair of ophthalmic lenses adapted to a wearer the method comprises implementing the method described previously for a single ophthalmic lens to both ophthalmic lenses using a common selection of binocular object points corresponding to at least part of the set of object points associated with target optical performances based on the wearer data.

According to a preferred embodiment of the invention, the common selection of binocular object points corresponds to a weighted sum of the projection of a selection of at least part of object points that correspond to the meridian of each reference ophthalmic lens on a common plane.

Such binocular method is illustrated on FIG. 7.

For example, a selection of a lest part of object points that correspond to the meridian of the right reference ophthalmic lens is projected on a so-called common plane and a selection of a lest part of object points that correspond to the meridian of the left reference ophthalmic lens is projected on the same common plane.

According to an embodiment of the invention, the position of the common plane along the line passing through the centers of rotation of the eyes of the wearer is determined based on the dominant eye of the wearer.

The weighted sum of the projections of both eyes is preferably done for a plurality of gazing direction from the cyclopean eye of the wearer. Indeed, using the gazing directions from the cyclopean eye appears to provide better results.

The relative weight in the weighted sum may be determined based on the dominant eye of the wearer.

The ophthalmic lens or the pair of ophthalmic lenses determined according to the method of the invention may be manufactured using any known manufacturing method.

The method of the invention may further comprise a manufacturing step during which the determined ophthalmic lens or pair of ophthalmic lenses is/are manufactured.

Furthermore, the invention relates to a pair of progressive ophthalmic lenses adapted for a wearer in worn conditions.

The pair of ophthalmic lenses according to the invention is characterized by the fact that for a given set of object points corresponding to gaze directions within an angular disc of 35° of diameter centered on a direction of gaze corresponding to an angle of declination of 8° and 0° of azimuth angle and with a sampling step of 2°, $$\frac{1}{\sum_{objectpoints}} \sum_{objectpoints} \frac{|A_r - A_l|}{Add}$$

is smaller than or equal to 0.026 with Ar the resulting astigmatism at the given object point through the right progressive ophthalmic lens, Al the resulting astigmatism at the given object point through the left progressive ophthalmic lens and Add the prescribed addition of the wearer.

Preferably, $$\frac{1}{\sum_{objectpoints}} \sum_{objectpoints} \frac{|A_r - A_l|}{Add}$$

is smaller than or equal to 0.023.

The pair of progressive ophthalmic lenses according to the invention may further be characterized by having $$\frac{1}{\sum_{objectpoints}} \sum_{objectpoints} \frac{|P_r - P_l|}{Add}$$

smaller than or equal to 0.026 with Pr the mean power at the given object point through the right progressive ophthalmic lens and Pl the mean power at the given object point through the left progressive ophthalmic lens.

Preferably, $$\frac{1}{\sum_{objectpoints}} \sum_{objectpoints} \frac{|P_r - P_l|}{Add}$$

is smaller than or equal to 0.023.

The pair of progressive ophthalmic lenses according to the invention may be made for an anisometrope wearer.

The inventors have compared a pair of ophthalmic lenses determined according to the method of the invention and a pair of ophthalmic lenses determined using a usual ergorama.

The ophthalmic prescription for the right eye of the wearer is a sphere of −4.75 D, a cylinder of −0.25 D and astigmatism axis of 70° and for the left eye of the wearer is sphere of −4.00 D, a cylinder of −0.75 D and astigmatism axis of 100°.

Figure 8:
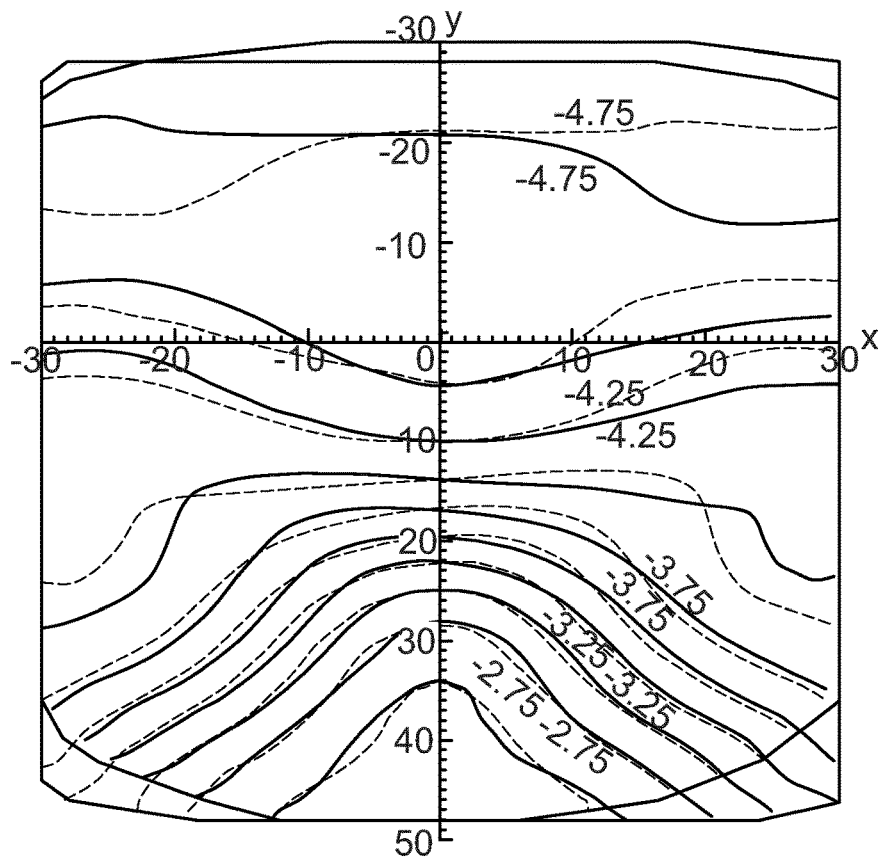
FIGS. 8 to 11 illustrate different optical power and astigmatism differences between right and left eyes for ophthalmic lenses obtained by the method of the invention and a prior art method.
Figure 9:
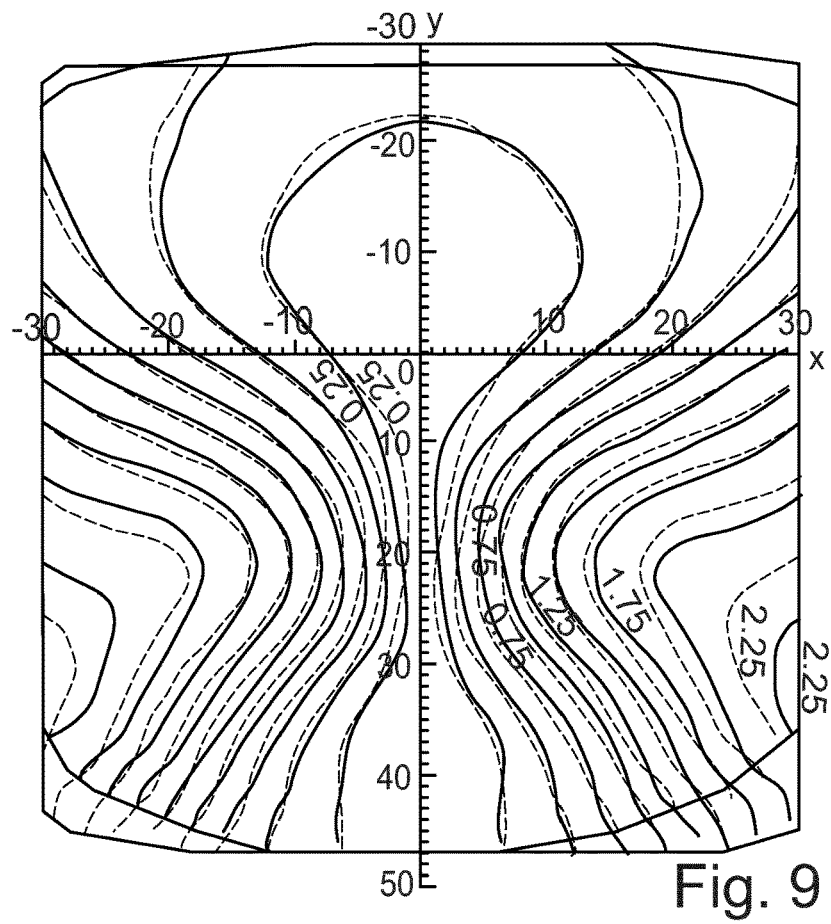

FIG. 8 illustrates the optical power performances in binocular referential for the left and right lenses and FIG. 9 illustrates the astigmatism performances in binocular referential for the left and right lenses of a pair of lenses determined using a method of the invention.

Figure 10:
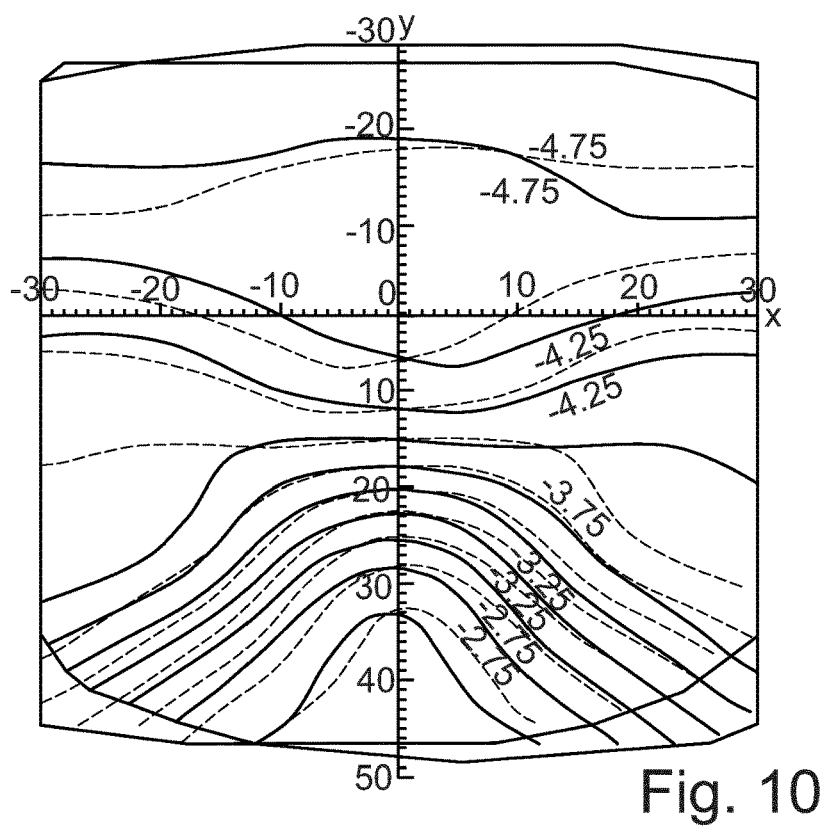
Figure 11:
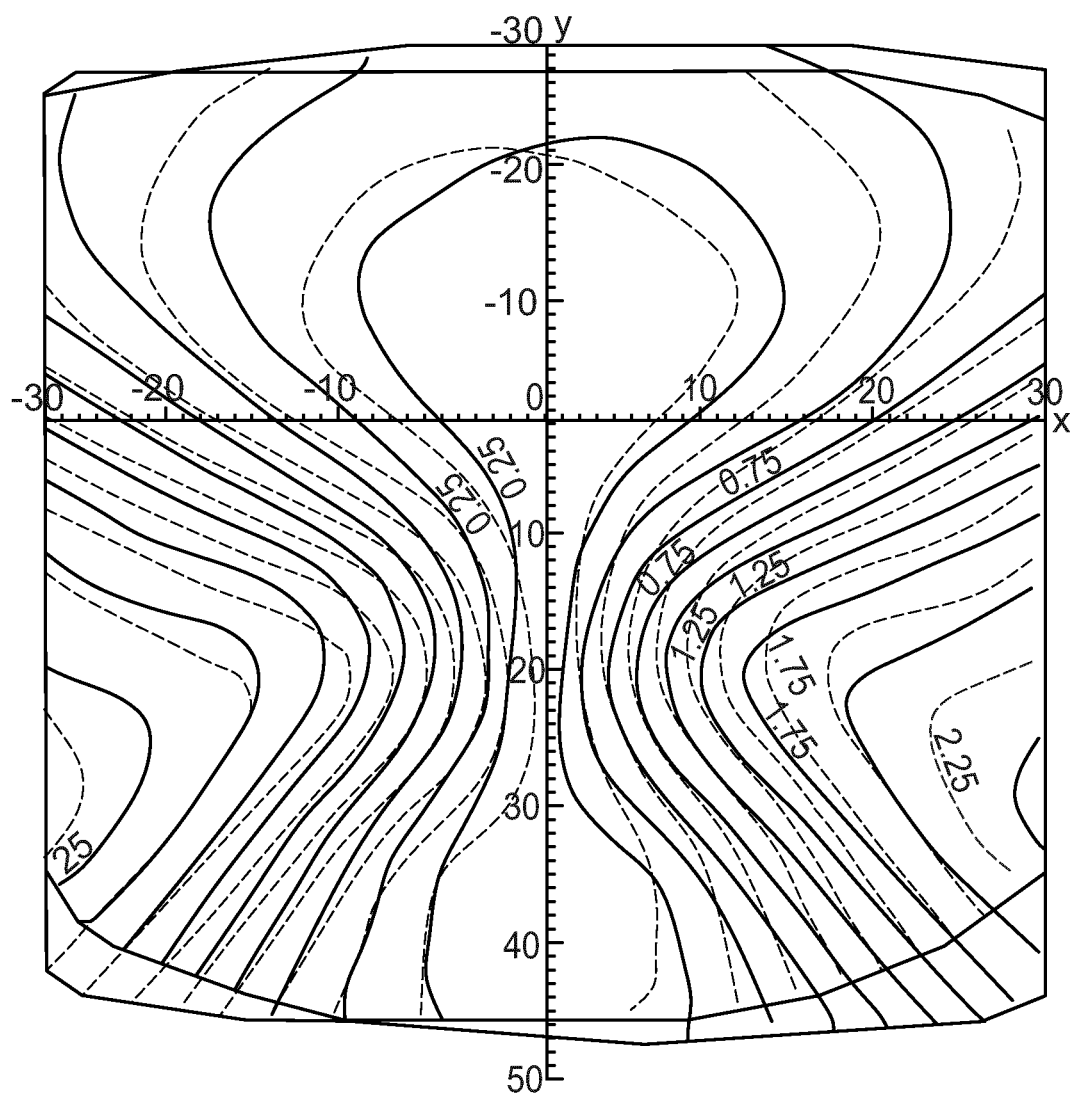

FIG. 10 illustrates the optical power performances in binocular referential for the left and right lenses and FIG. 11 illustrates the astigmatism performances in binocular referential for the left and right lenses of a pair of lenses determined using a method of the prior art.

For a given binocular gaze direction, astigmatism and optical power from right and left Eye are closest for the pair of ophthalmic lenses obtained using the method of the invention than for the pair of ophthalmic lenses obtained using the prior art method.

In the sense of the invention the binocular gaze direction corresponds to a gaze direction of look from the cyclops eye as shown in FIG. 7. The CRO of the cyclops eye is located by default in the middle of the centers of rotation of the both eyes, but it can be positioned elsewhere on the segment connecting the centers of rotation of the both eyes typically according to the visual dominance of the wearer.

Thus, binocular performances of the pair of ophthalmic lenses obtained by the method of the invention are improved.

The pair of ophthalmic lenses obtained by the method of the invention also fulfils the synchronization criteria $$\frac{1}{\sum_{objectpoints}} \sum_{objectpoints} \frac{|A_r - A_l|}{Add} \text{ and}$$

$$\frac{1}{\sum_{objectpoints}} \sum_{objectpoints} \frac{|P_r - P_l|}{Add}.$$

The inventors have determined that $$\frac{1}{\sum_{objectpoints}} \sum_{objectpoints} \frac{|A_r - A_l|}{Add}$$

is equal to 0.016 for the pair of ophthalmic lenses determined with the method of the invention whereas it is equal to 0.047 for the pair of ophthalmic lenses determined with the method of the prior art.

The inventors have determined that $$\frac{1}{\sum_{objectpoints}} \sum_{objectpoints} \frac{|P_r - P_l|}{Add}$$

is equal to 0.020 for the pair of ophthalmic lenses determined with the method of the invention whereas it is equal to 0.027 for the pair of ophthalmic lenses determined with the method of the prior art.

Such determination has been done for a given set of object points corresponding to gaze directions within an angular disc of 35° of diameter centered on a direction of gaze corresponding to an angle of declination of 8° and 0° of azimuth angle and with a sampling step of 2°.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by a computer for determining an ophthalmic lens adapted to a wearer, the method comprising:
   receiving wearer data comprising at least an ophthalmic prescription of said wearer;
   receiving a set of object points associated with target optical performances based on the wearer data;
   determining an ophthalmic lens adapted to the wearer, said ophthalmic lens providing optical performances, for light rays propagating from the set of object points to the center of rotation of an eye of the wearer passing through the ophthalmic lens, the closest to the target optical performances,
   wherein determining an ophthalmic lens adapted to the wearer includes optimizing an initial ophthalmic lens so that the light rays propagating from a selection of at least part of object points of said set of object points to the center of rotation of the eye of the wearer passing through the ophthalmic lens fulfill the target optical performances, and
   wherein the object points of the selection of at least part of object points are unchanged during the optimization of the initial ophthalmic lens,
   wherein the ophthalmic lens is a power variation ophthalmic lens having at least two points of reference corresponding to ophthalmic prescriptions for two different viewing distances, and
   wherein when associating target optical performances to a selection of points of the set of object points, at least one object point at a second distance different from a first distance has an optical power and/or astigmatism and/or astigmatism axis that corresponds to a second distance vision prescription of the wearer.

2. The method according to claim 1, the set of object points is determined by:
   determining a set of object points based on the wearer data,
   associating target optical performances to the set of object points based on the wearer data.

3. The method according to claim 2, wherein the set of object points and the associated target optical performances are determined using a reference ophthalmic lens based on the prescription of the wearer data placed in reference wearing conditions in front of the center of rotation of a reference eye.

4. The method according to claim 3, wherein the reference ophthalmic lens corresponds to an ophthalmic lens based on the ophthalmic prescription of a right eye of the wearer or a left eye of the wearer or based on a weighted average ophthalmic prescription between both eyes of the wearer.

5. The method according to claim 1, wherein deteiniining an ophthalmic lens adapted to the wearer comprises, at least, selecting among a list of different ophthalmic lenses the ophthalmic lens that provides optical performances for light rays propagating from a selection of at least part of object points of said set of object points to the center of rotation of the eye of the wearer passing through the ophthalmic lens the closest to the target optical performances.

6. The method according to claim 1, wherein when associating target optical performances to a selection of points of the set of object points, at least one object point at a first distance from the center of rotation of the eye has an optical power and/or astigmatism and/or astigmatism axis that corresponds to a first distance vision prescription of the wearer.

7. The method according to claim 1, wherein the method further comprises prior to associating target optical performances, a step of projecting a selection of at least part of object points that correspond to a meridian of a reference ophthalmic lens on a plane.

8. The method according to claim 1, wherein the method further comprises prior to associating target optical performances, a step of extruding a selection of a least part of said set of object points either along a direction or about an axis passing through a point along a segment linking both center of rotation of the eyes of the wearer.

9. A method implemented by a computer for determining a pair of ophthalmic lenses adapted to a wearer, the method comprising implementing the method according to claim 1 to both ophthalmic lenses using a common selection of binocular object points corresponding to at least part of the set of object points associated with target optical performances based on the wearer data.

10. The method according to claim 9, wherein the common selection of binocular object points corresponds to a weighted sum of the projection of a selection of at least part of object points that correspond to a meridian of each reference ophthalmic lens on a common plane.

11. The method according to claim 10, wherein the weighted sum is done for a plurality of gazing direction from a cyclopean eye of the wearer.

12. A system comprising:
a pair of progressive ophthalmic lenses adapted for a wearer in worn conditions,
wherein the ophthalmic lenses are adapted such that for a given set of object points corresponding to gaze directions within an angular disc of 35° of diameter centered on a direction of gaze corresponding to an angle of declination of 8° and 0° of azimuth angle and with a sampling step of 2°, $$\frac{1}{\sum_{objectpoints}} \sum_{objectpoints} \frac{|A_r - A_l|}{Add}$$

is smaller than or equal to 0.026 with Ar the resulting astigmatism at the given object point through the right progressive ophthalmic lens, Al the resulting astigmatism at the given object point through the left progressive ophthalmic lens and Add the prescribed addition of the wearer.

13. A non-transitory computer readable medium having stored thereon a program that when executed by a computer causes to the computer to implement a method for determining an ophthalmic lens adapted to a wearer, the method comprising:
receiving wearer data comprising at least an ophthalmic prescription of said wearer;
receiving a set of object points associated with target optical performances based on the wearer data;
determining an ophthalmic lens adapted to the wearer, said ophthalmic lens providing optical performances, for light rays propagating from the set of object points to the center of rotation of an eye of the wearer passing through the ophthalmic lens, the closest to the target optical performances,
wherein deteiiiiining an ophthalmic lens adapted to the wearer includes optimizing an initial ophthalmic lens so that the light rays propagating from a selection of at least part of object points of said set of object points to the center of rotation of the eye of the wearer passing through the ophthalmic lens fulfill the target optical performances, and
wherein the object points of the selection of at least part of object points are unchanged during the optimization of the initial ophthalmic lens,
wherein the ophthalmic lens is a power variation ophthalmic lens having at least two points of reference corresponding to ophthalmic prescriptions for two different viewing distances, and
wherein when associating target optical performances to a selection of points of the set of object points, at least one object point at a second distance different from a first distance has an optical power and/or astigmatism and/or astigmatism axis that corresponds to a second distance vision prescription of the wearer.

* * * * *